United States Patent [19]

Kaga et al.

[11] Patent Number: 4,608,703
[45] Date of Patent: Aug. 26, 1986

[54] SYNCHRONIZATION DETECTION SYSTEM FOR DATA TRANSMISSION

[75] Inventors: Mitsuru Kaga, Hatano; Shigetaka Tanaka, Atsugi, both of Japan

[73] Assignee: Ricoh Company, Ltd., Tokyo, Japan

[21] Appl. No.: 608,625

[22] Filed: May 9, 1984

[30] Foreign Application Priority Data

| May 12, 1983 | [JP] | Japan | 58-81665 |
| May 13, 1983 | [JP] | Japan | 58-82474 |
| May 13, 1983 | [JP] | Japan | 58-82475 |
| Jun. 6, 1983 | [JP] | Japan | 58-99448 |

[51] Int. Cl.$^4$ .................. H04L 7/04; H04L 23/02
[52] U.S. Cl. ............................ 375/114; 375/13; 375/39
[58] Field of Search ............ 375/11, 12, 13, 14, 375/39, 114, 115

[56] References Cited

U.S. PATENT DOCUMENTS

| 3,694,757 | 9/1972 | Hanna, Jr. | 375/115 |
| 4,027,250 | 5/1977 | Lang | 375/13 |
| 4,334,313 | 6/1982 | Gitlin et al. | 375/13 |
| 4,381,546 | 4/1983 | Armstrong | 375/39 |
| 4,433,425 | 2/1984 | de Jaeger | 375/113 |

FOREIGN PATENT DOCUMENTS

| 0074207 | 6/1977 | Japan | 375/39 |
| 0001631 | 1/1981 | Japan | 375/13 |

Primary Examiner—Marc E. Bookbinder
Assistant Examiner—Andrew J. Telesz, Jr.
Attorney, Agent, or Firm—David G. Alexander

[57] ABSTRACT

A synchronization detecting system for data transmission in which a two-dimensionally modulated signal is received by way of a demodulator. In a training sequence for a two-dimensional modulation modem, a point of transition from an alternation to a pseudorandom symbol sequence is detected by producing a sum of the vectors of two signals which are remote from each other by a period of two samples, or a difference therebetween. Whether the detection of the transition point has been correct is decided utilizing the alternation.

8 Claims, 14 Drawing Figures

SYNCHRONIZATION DETECTION SYSTEM FOR DATA TRANSMISSION

BACKGROUND OF THE INVENTION

The present invention relates to a synchronization detection system and, more particularly, to one for use in data transmission in which two-dimensionally modulated signals are received by way of a demodulator.

As well known in the art, where facsimile signals, data and like digital signals are to be transmitted over an analog transmission line such as a telephone line, they are often subjected to quadrature amplitude modulation (QAM) which uses a modem. At the time of receipt of a signal from a transmission line, receipt of an actual information signal is preceded by a training sequence for the modem in order to set up synchronization, that is, initializing the modem to converge the parameters associated with an equalizer, automatic gain control and other various functions.

For example, in accordance with the CCITT (Consultive Committee of International Telegraph and Telephone) Recommendation V. 29, an alternating repetitive pattern of binary symbols, i.e. alternation, is transmitted at the beginning of a training sequence (segment 2), followed by an equalizer setting pattern for converging various parameters of an equalizer (segment 3). Concerning the alternation prescribed by the Recommendation V. 29, as shown in a signal space with an in-phase axis I and a quadrature axis Q in FIG. 1, the initial symbol element A has a relative amplitude of 3 and a phase of 180 degrees with respect to the reference phase, while the second symbol element B has a relative amplitude of $3\sqrt{2}$ and a phase of 315 degrees at, for example, a data rate of 9,600 bits/second.

Figure 2:
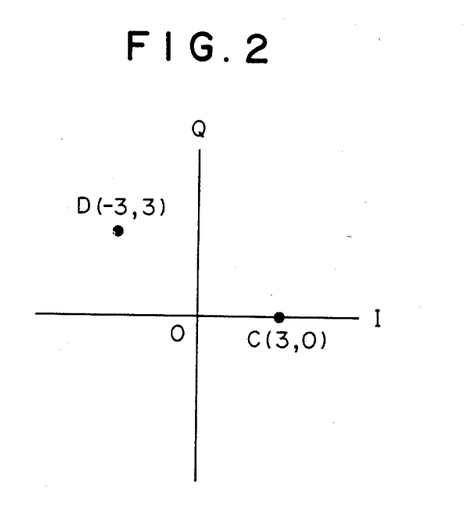

The procedure advances to the segment 3 after the above-stated alternation has occurred over a period of 128 symbols. In the segment 3, as shown in FIG. 2, one element C has a relative amplitude of 3 and a phase of 0 degree with respect to the reference phase, while the other element D has a relative amplitude of $3\sqrt{2}$ and a phase of 135 degrees at, for example, a data rate of 9,600 bits/second. The segment 3 comprises a pseudorandom sequence of such elements C and D.

The transition from the alternation to the pseudorandom sequence may be detected by discriminating the binary symbol of AB or CD at the modem of a receiving station. However, in order to effect fast convergence at the time of initializing the tap gain of an equalizer, a modem at a receiving station generally generates reference symbols and compares them with an equalizer initializing pattern to adjust the tap gain, instead of discriminating the binary symbols as described.

In detail, in the event of correcting the tap coefficient of an equalizer, the intersymbol interference is considerable and the adjustment of timing or that of carrier phase is insufficient at an initial stage of the training, rendering the discrimination of a binary symbol sometimes inaccurate. This is the reason for employing the method in which a receiving station generates as a reference signal a symbol sequence identical with a pseudorandom sequence which a transmitting station has sent, thereby correcting the tap coefficient of an equalizer. This method is practicable because the training sequence is known by the receiving station. The pseudorandom sequence generated by the receiving station has to be synchronous with the received symbol sequence and, for such synchronization, a transition point in the training sequence has to be accurately detected.

Japanese Patent Laid-Open Publication No. 52-89407/1977, for example, proposes a method which produces a vector sum of two samples which are continuous in a signal space, and detects a time point when the real number portion of the vector sum becomes maximum. In another prior art method, an envelope signal is produced by the square sum of a demodulated in-phase signal and quadrature signal and the transition point is detected in terms of a rise of the envelope signal beyond a certain level (e.g. Japanese Patent Laid-Open Publication No. 56-1631/1981). In still another prior art method, a received signal is multiplied by a carrier component so that the transition point may be identified in terms of inversion of the polarity of the product (e.g. Japanese Patent Laid-Open Publication No. 56-119562/1981).

The problem encountered with any of the above-discussed prior art methods is that, where the distortion on the transmission line is substantial, symbols before and after a point of signal change greatly interfere with each other and, particularly at the initial stage of training, the intersymbol interference and timing error enhance the signal distortion. The result is an error on the order of $\pm 1$ symbol in terms of time in the detection of a transition point from the segment 2 to the segment 3. In the case of a system which picks up timing information necessary for controlling a modem from the taps of an equalizer, the error on the order of $\pm 1$ symbol in the detection of a transition point makes it impossible to pick up correct timing information and often causes deviation of synchronization by a period of one to two samples, disenabling the modem to function properly.

SUMMARY OF THE INVENTION

It is therefore an object of the present invention to provide a synchronization detection system which minimizes an error in the detection of a transition point from an alternating symbol sequence to a pseudorandom symbol sequence in a training sequence for a modem.

It is another object of the present invention to provide a synchronization detection system which is capable of determining whether a transition point from a repetitive symbol sequence to a pseuodorandom symbol sequence in a training sequence for a modem has been correctly detected.

It is another object of the present invention to provide a generally improved synchronization detection system for data transmission.

In one aspect of the present invention, there is provided a system for detecting synchronization in data transmission which, in a training sequence for receiving a two-dimensionally modulated signal by way of a demodulator, detects a point of transition from an alternating symbol sequence of two different symbol elements to a pseudorandom symbol sequence. The system comprises a calculator for calculating a vector sum of two signals in a signal space which are time-serially remote from each other by a period of two symbol elements, a comparator for comparing the vector sum with a predetermined threshold value, and a detector for detecting the point of transition in terms of a decrease of the vector sum beyond the threshold value.

In another aspect of the present invention, there is provided a system for detecting synchronization in data transmission which, in a training sequence for receiving a two-dimensionally modulated signal by way of a demodulator, detects a point of transition from an alternating symbol sequence of two different symbol elements to a pseudorandom symbol sequence. The system comprises a calculator for calculating a vector difference between two signals in a signal space which are time-serially remote from each other by a period of two symbol elements, a comparator means for comparing the vector difference with a predetermined threshold value, and a detector for detecting the point of transition in terms of an increase in the vector difference beyond the threshold value.

In another aspect of the present invention, there is provided a system for detecting synchronization in data transmission which, in a training sequence for receiving a two-dimensionally modulated signal by way of a demodulator, detects a point of transition from an alternating symbol sequence of two different symbol elements to a pseudorandom symbol sequence. The system comprises a first detector for detecting the point of transition, a second detector for determining whether a symbol at a first time point which is antecedent to the time point of the detection of the transition by a first predetermined period of time and a symbol at a second time point which is antecedent to the time point of the detection of the transition by a second predetermined period of time correspond to anticipated two symbol elements in the alternating symbol sequence, and a decision circuit for deciding that the point of transition is correct when the symbols at the first and second predetermined time points correspond to the anticipated symbols.

The above and other objects, features and advantages of the present invention will become apparent from the following detailed description taken with the accompanying drawings.

BRIEF DESCRIPTION OF THE DRAWING

FIG. 15 is a graph demonstrating phase correction in accordance with the embodiment shown in FIG. 12.

DESCRIPTION OF THE PREFERRED EMBODIMENT

While the synchronization detection system for data transmission of the present invention is susceptible of numerous physical embodiments, depending upon the environment and requirements of use, substantial numbers of the herein shown and described embodiments have been made, tested and used, and all have performed in an eminently satisfactory manner.

In this specification, the term "data" should be understood to imply not only the data in the narrow sense which are the information contained in encoded signals but also the data in the broad sense which are prepared by, for example, converting pictures and other patterns into digital signals.

Figure 3:
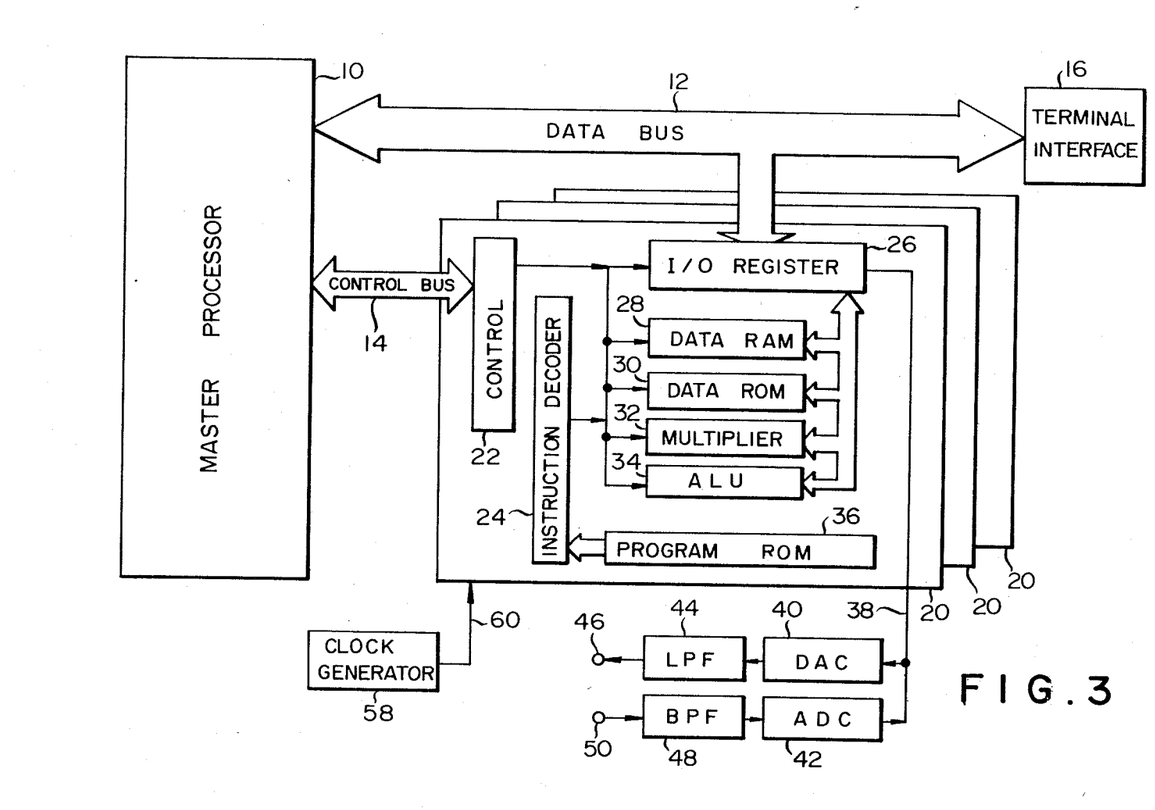
FIG. 3 is a block diagram showing an exemplary fundamental construction of a signal processor for implementing various functions of a modem to which the system of the present invention is applied.

Referring to FIG. 3, a signal processor of the present invention which implements various functions of a modem is shown and basically comprises a master processor 10 and a slave processor 20, which are interconnected by a data bus 12 and a control bus 14. The master processor 10 comprises a digital processor and serves as a system controller for controlling the operation of the whole system. The slave processor 20, also comprising a digital processor, is a signal processor adapted to realize mainly the shaping filter function, line equalizing function and the like of a modem. If desired, a plurality of slave processors 20 identical in construction may be connected in parallel in order to scatter the loads or tasks.

As shown, the slave processor 20 includes a control section 22, an instruction decoder 24, an I/O register 26, a data RAM 28, a data ROM 30, a multiplier 32, an arithmetic logic unit (ALU) 34, and a program ROM 36. The program ROM 36 stores instructions for causing the system to execute various functions such as filtering and equalizing functions as a program sequence. Such instructions are decoded by the instruction decoder 24. Connected to the control bus 14, the control section 22 receives an instruction from the master processor 10, decodes the instruction, and in turn instructs operations assigned to various portions of the slave processor 20.

The data RAM 28 and the data ROM 30 constitute areas for storing various data which are necessary for performing the filter, equalizer and other functions. For example, they store the tap constants of the shaping filter.

The multiplier 32 and ALU 34 perform calculation with data in the data RAM 28 or those in the data ROM 30 in response to an instruction stored in the program ROM 36 or an instruction from the master processor 10, thereby realizing the filter function and others necessary for a modem.

The I/O register 26 is connected to the data bus 12 which is also connected to a terminal interface 16. Connected to the system via the terminal interface 16 is a facsimile apparatus or like terminal. The I/O register 26 is connected by a line 38 to a digital-to-analog (DA) converter 40 and an analog-to-digital (AD) converter 42. The DA converter 40 is connected via low-pass filter 44 to a transmit line 46 of an analog communication line, e.g. telephone line. The AD converter 42 is connected via a band-pass filter 48 to a receive line 50 of the analog communication line.

The slave processor 20 implements various functions of a modem by digital processings in response to sampling clock which is supplied thereto from a clock generator 58 via a line 60. Data modulated by the slave processor 20 are sent out from the I/O register 26 to the transmission line 46 via the DA converter 40 and low-pass filter 44. The signal coming in through the receive line 50 is routed through the band-pass filter 48, AD converter 42 and I/O register 26 to the slave processor 20 to be demodulated thereby.

Figure 4:
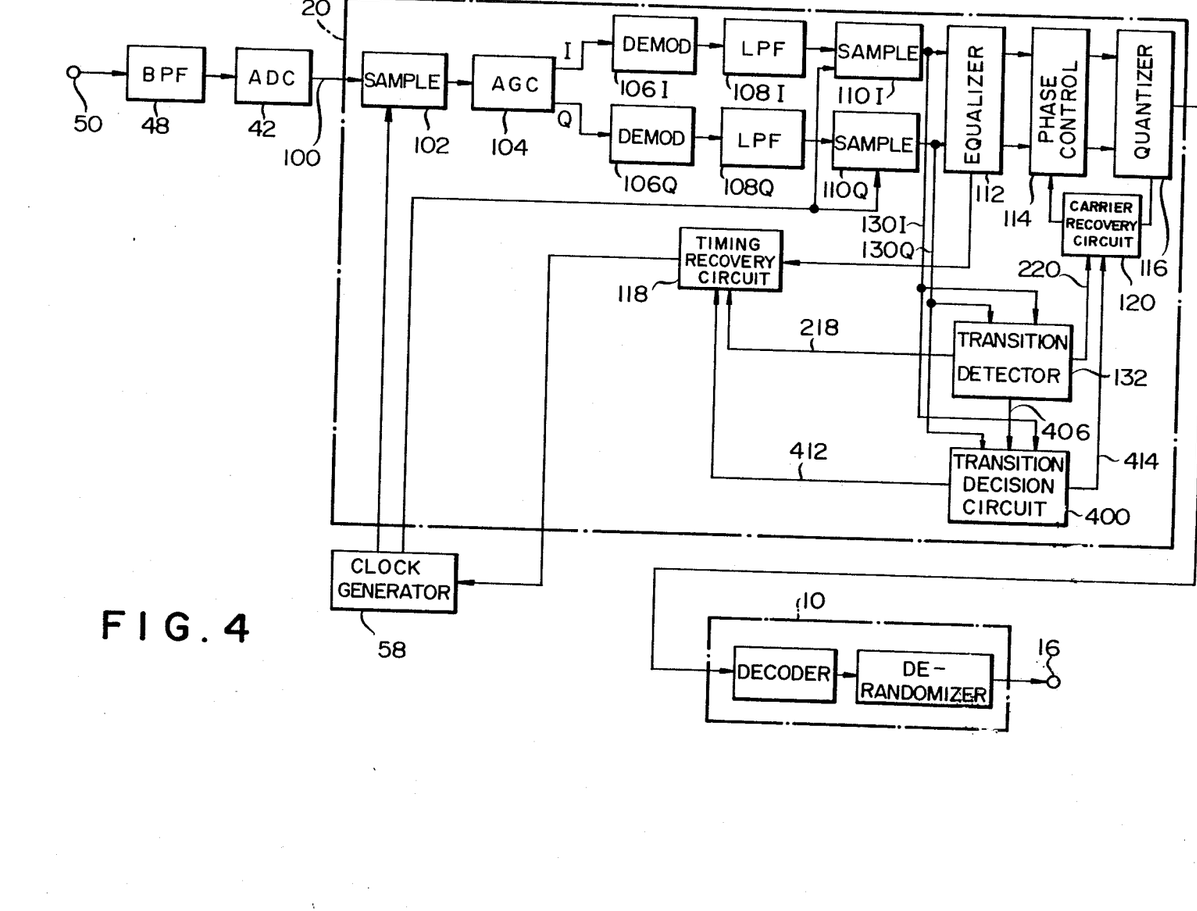
FIG. 4 is a block diagram schematically showing a receive function of a modem which is implemented by the digital processor shown in FIG. 3.

Referring to FIG. 4, functions assigned to a receiving side of a modem which may be realized by the digital processor of FIG. 3 are schematically shown in a block diagram. In FIG. 4, the same blocks as those shown in FIG. 3 are designated by like reference numerals.

A received signal 100 converted by the AD conerter 42 to a digital signal is sampled by a sampling circuit 102 in response to the sampling clock output from the clock generator 58. The output of the sampling circuit 102 is controlled by an automatic gain control (AGC) circuit 104. The output of the AGC circuit 104 is made up of an in-phase component I and a quadrature component Q. The in-phase component I is routed through a demodulator (DEMOD) 106I, a low-pass filter (LPF) 108I, a sampling circuit 110I, an automatic line equalizer 112, and a phase control circuit 114 to a quantizer 116. Likewise, the quadrature component Q is routed through a demodulator (DEMOD) 106Q, a low-pass filter 108Q, a sampling circuit 110Q, the equalizer 112, and the phase controller 114 to the quantizer 116. A timing recovery circuit 118 recovers a timing from each tap of the equalizer 112 to control the clock generator 58. A carrier recovery circuit 120 recovers a carrier out of an output of the quantizer 116 to control the phase control circuit 114. The function of decoding and randomizing the received signal is assigned to the main processor 10.

Such various modem functions are attained by calculting data stored in the data RAM 28 and those stored in the data ROM 30 according to the instruction sequence stored in the master processor 10 and the program sequence stored in the program ROM 36.

The in-phase component 130I output from the sampler 110I and the quadrature component 130Q output from the sampler 110Q are also applied to a transition detector 132. The transition detector 132 is responsive to a point of transition from an alternation to a pseudorandom sequence in the previously discussed training sequence for a modem.

Figure 5:
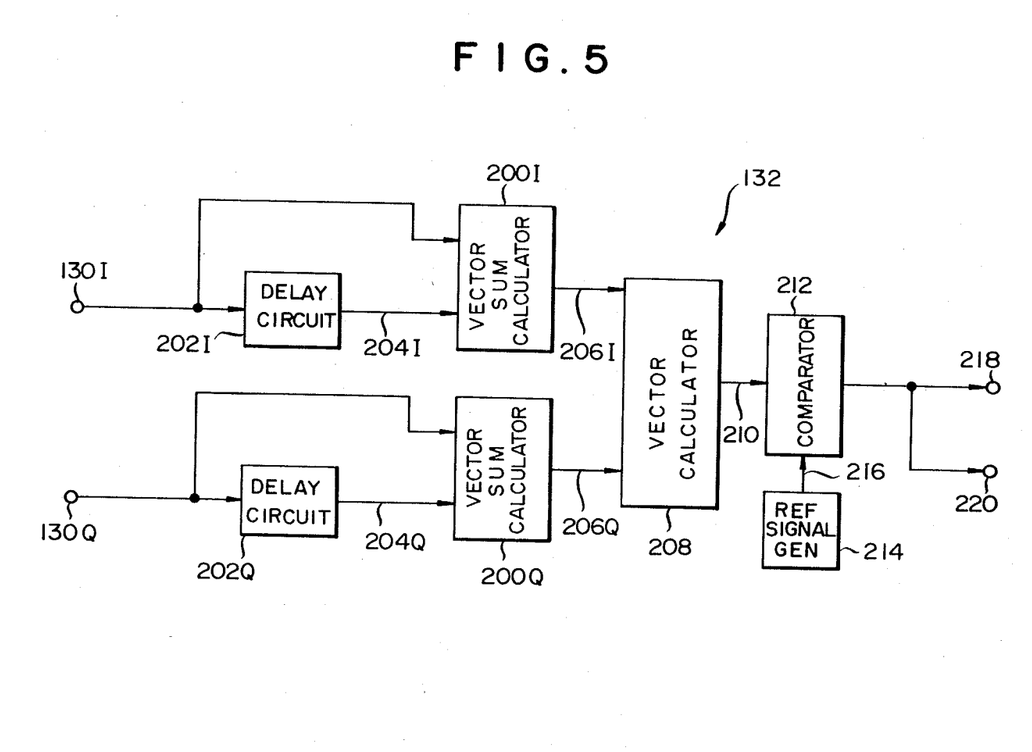
FIG. 5 is a function block diagram representative of details of a transition detecting function included in the arrangement of FIG. 4.
Figure 7:
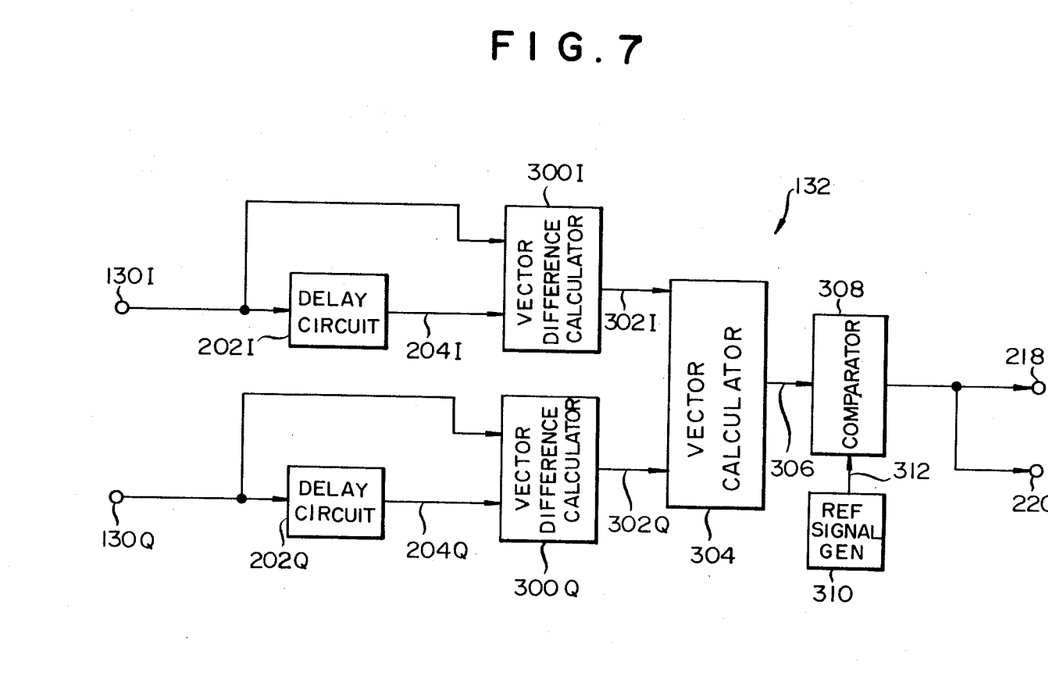
FIG. 7 is a function block diagram representative of details of another example of the transition detecting function shown in FIG. 4.

Hereinafter will be described two different embodiments of the transition detector 132 which are schematically shown in FIGS. 5 and 7, respectively.

Figure 1:
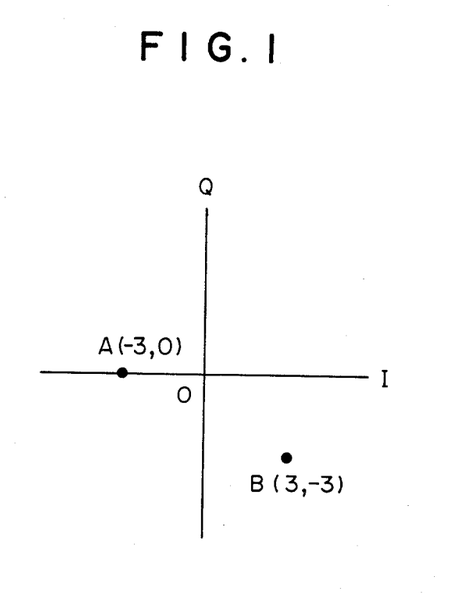
FIGS. 1 and 2 are signal space diagrams representative of exemplary symbols which are used for training a modem.

First, the embodiment shown in FIG. 5 will be described. Taking the CCITT Recommendation V. 29 for example, an alternation of two symbols A and B shown in FIG. 1 is followed by a pseudorandom sequence of symbols C and D shown in FIG. 2 in the training sequence for a modem. That is, the training signal is in a symbol sequence of, for example, ... A B A B C D C D ... and, in the meantime, transition from the segment 2 to the segment 3 occurs.

Figure 6:
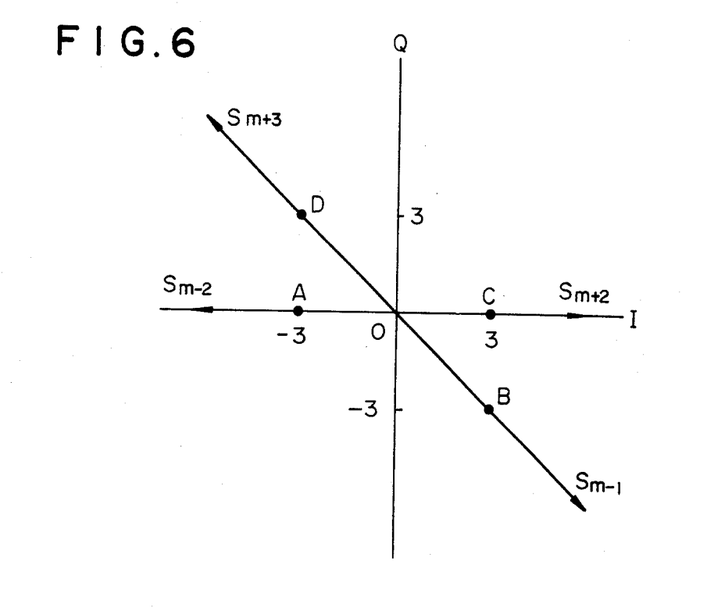
FIG. 6 is a signal space vector diagram useful for describing the principle of the system in accordance with the present invention.

The symbols A, B, C and D will be discussed in terms of vectors in a signal space as shown in FIG. 6. In the vicinity of a transition point in the above-mentioned example, sums S of respective two vectors which are remote from each other by a period of two samples is produced as $$S_{m-2} = A + A$$

$$S_{m-1} = B + B$$

$$S_m = A + C$$

$$S_{m+1} = B + D$$

$$S_{m+2} = C + C$$

$$S_{m+3} = D + D$$

So long as the transmission line is in an ideal condition, the vectors A and C and the vectors B and D are respectively identical in magnitude and opposite in phase as will be understood from FIG. 6. Then, the vector sums $S_m$ and $S_{m+1}$ are both zero, while the other vectors have large absolute values as illustrated. Therefore, setting a threshold value between the two different kinds of vectors in due consideration of an allowable line distortion condition so as to discriminate them from each other, it is possible to detect a aforementioned transition, i.e. start point of the segment 3. The construction shown in FIG. 5 performs such vector operation and discrimination.

Referring to FIG. 4, the received signal is separated into the in-phase component I and the quadrature component Q, then demodulated, and then applied to the transition detector 132 with a multiplied frequency component entailed by demodulation removed.

Referring to FIG. 5, the in-phase component 130I of the received signal is applied directly to a vector sum calculator 200I and indirectly thereto as an output 204I of a delay circuit 202I. Likewise, the quadrature component 130Q is applied directly to a vector sum calculator 200Q and indirectly thereto as an output 204Q of a delay circuit 202Q. Each of the delay circuits 202I and 202Q applies a delay to the received input by a period of two samples, i.e. 2-symbol period. Therefore, each of the vector sum calculators 200I and 200Q obtains the previously mentioned sum vector S by adding a currently appearing received signal and a received signal appeared a 2-sample period before.

The outputs 206I and 206Q of the vector sum calculators 200I and 200Q are fed to a vector calculator 208 which is adapted to produce an absolute value of the sum vector S. Alternatively, the vector calculator 208 may be constructed to produce a square sum of the sum vector S, or power of the signal, instead of the absolute value. In any case, the output 210 of the calculator 208 is compared by a comparator 212 with a reference signal 216 which is output from a reference signal generator 214. The reference signal 216 is representative of the previously stated threshold value, that is, a value distinguishing the vectors $S_m$ and $S_{m+1}$ which are substantially zero and the other or large vectors from each other. The comparator 212, therefore, renders outputs 218 and 220 significant when the input 210 has lowered beyond the threshold value. This allows, for example, the timing recovery circuit 118 and carrier recovery circuit 120 (FIG. 4) to be informed of the detection of a transition from an alternation to a pseudorandom sequence.

In the manner described, a vector sum of two signals which are remote from each other by a 2-sample period is produced to detect a point of transition in the training sequence for a modem. The two signals so remote from each other in terms of time is far smaller in intersymbol interference than two adjacent signals heretofore employed for the detection, thereby remarkably increasing the accuracy of detection. This insures accurate detection of a point of transition even when the line distortion is substantial.

Figure 8:
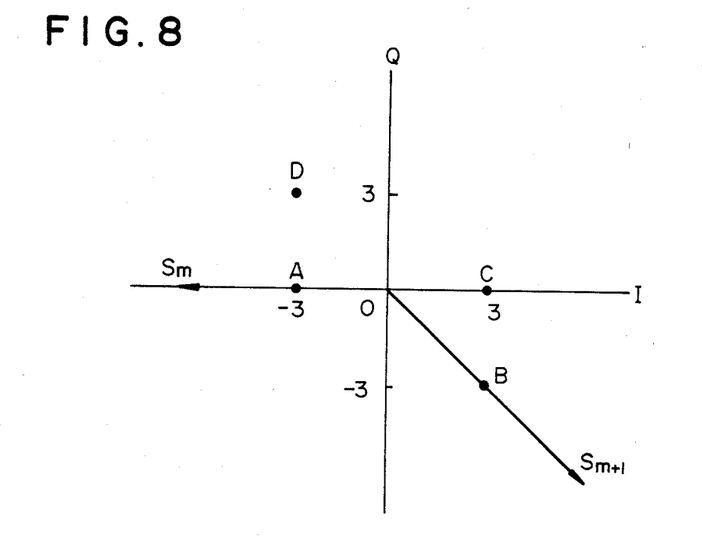
FIG. 8 is a signal space vector diagram useful for describing the principle of the system in accordance with the present invention.

Another embodiment of the transition detector 134 will be described with reference to FIG. 7. Assume that the symbols A, B, C and D in FIGS. 1 and 2 are the vectors in a signal space as shown in FIG. 8. Then, a vector difference S between two vectors which have an interval of a 2-sample period therebetween is, in the vicinity of a transition point in the above example, $$S_{m-2} = A - A$$

$$S_{m-1} = B - B$$

$$S_m = A - C$$

$$S_{m+1} = B - D$$

$$S_{m+2} = C - C$$

$$S_{m+3} = D - D$$

So long as the transmission line is in an ideal condition, the vectors A and C and the vectors B and D are respectively identical in magnitude and opposite in phase as will be seen from FIG. 8. Therefore, the vector differences $S_m$ and $S_{m+1}$ turn out to be the vectors with large absolute values as illustrated, while the other vectors are commonly zero. It follows that, setting a threshold value between the two kinds of vectors in due consideration of an allowable line distortion to distinguish them from each other, it is possible to detect the aforementioned transition point, i.e. start point of the segment 3. The construction shown in FIG. 7 performs such vector operation and discrimination.

Referring to FIG. 4, the received signal is separated into the in-phase component I and the quadrature component Q, then demodulated, and then applied to the transition detector 132 with a multiplied frequency component entailed by demodulation removed.

Referring to FIG. 7, the in-phase component 130I of the received signal is applied directly to a vector difference calculator 300I and indirectly thereto as an output 204I of the delay circuit 202I. Likewise, the quadrature component 130Q is applied directly to a vector difference calculator 300Q and as an output 204Q of the delay circuit 202Q. Each of the delay circuits 202I and 202Q applies a delay to the received input by a period of two samples, i.e. 2-symbol period. Therefore, each of the vector difference calculators 300I and 300Q obtains the previously mentioned difference vector S by determining a vector difference between a currently appearing received signal and a received signal appeared a 2-sample period before.

The outputs 302I and 302Q of the vector difference calculators 300I and 300Q are fed to a vector calculator 304 which is adapted to produce an absolute value of the difference vector S. Alternatively, the vector calculator 304 may be constructed to produce a square sum of the sum vector S, or power of the signal, instead of the absolute value. In any case, the output 306 of the vector calculator 304 is compared by a comparator 308 with a reference signal 312 which is output from a reference signal generator 310. The reference signal 312 is representative of the previously stated threshold value, that is, a value distinguishing the vectors $S_m$ and $S_{m+1}$ with substantially large values from the other vectors which are substantially zero. The comparator 308, therefore, renders the outputs 218 and 220 significant when the input 306 has been raised beyond the threshold value. This allows, for example, the timing recovery circuit 118 and carrier recovery circuit 120 (FIG. 4) to be informed of the detection of a transition from an alternation to a pseudorandom sequence.

Obtaining a vector difference between two 2-sample remote vectors as described above is effective to cancel intersymbol interference. This will be described in detail hereinafter.

Assuming that the impulse response of the whole transmission system is h(t), a signal ZA actually received at the instant expected to receive the signal A of the alternation is $$ZA(t) = A \sum_{p=-\infty}^{+\infty} h(t - 2pT) + B \sum_{p=-\infty}^{+\infty} p(t - (2p + 1)T)$$

Likewise, concerning the signal B, $$ZB(t) = B \sum_{p=-\infty}^{+\infty} h(t - 2pT) + A \sum_{p=-\infty}^{+\infty} p(t - (2p + 1)T)$$

where T is a sampling frequency.

Assume that the sampled value h(n) at t=nT of the impulse response h(t), and that h($-\infty$) to h($-3$) and h(3) to h($+\infty$) are negligibly small compared to h(0). Then, $$Z A(t) = A(h(-2) + h(0) + h(2)) + B(h(-1) + h(1))$$
$$Z B(t) = B(h(-2) + h(0) + h(2)) + A(h(-1) + h(1))$$

In the vicinity of a transition point t=mT from the alternation to the pseudorandom sequence, $$Z A((m - 2)T) = A(h(0) + h(2)) + B(h(-1) + h(1)) + C h(-2)$$
$$Z A((m - 1)T) = B(h(0) + h(2)) + A h(1) + C h(-1) + D h(-2)$$
$$Z A(mT) = C(h(-2) + h(0)) + B h(1) + A h(2) + D h(-1)$$
$$Z A((m + 1)T) = D(h(-2) + h(0)) + C(h(-1) + h(1)) + B h(2)$$

Therefore, a vector difference between two signals which have a lag of two samples from each other is produced by $$S_{m-2} = Ah(-2) - Ch(-2)$$

In this manner, the items associated with intersymbol interference such as h(2), h(1) and h($-1$) are omitted.

Performing the same calculation on $S_{m-1}$ to $S_{m+3}$ produces $$S m - 1 = B h(-2) + A h(-1) - C h(-1) - D h(-2)$$
$$S m = A h(0) + B h(-1) - C h(0) - D h(-1)$$
$$S m + 1 = B h(0) + A h(1) - D h(0) - C h(1)$$
$$S m + 2 = B h(1) + A h(2) - C h(2) - D h(1)$$
$$S m + 3 = B h(2) - D h(2).$$

As for t=kT in the alternation, $$S k = Z A((k - 2)T) - Z A(kT)$$
$$= 0$$

As described above, by producing a vector difference between two signals having a time lag of two samples, all or at least part of intersymbol interference is cancelled.

In this manner, a vector difference between two remote signals is calculated to detect a transition point in a training sequency for a modem. The vector difference between such two signals substantially cancels intersymbol interference between them to thereby considerably increase the accuracy of detection. This insures accurate detection even though the line distortion may be substantial.

Figure 9:
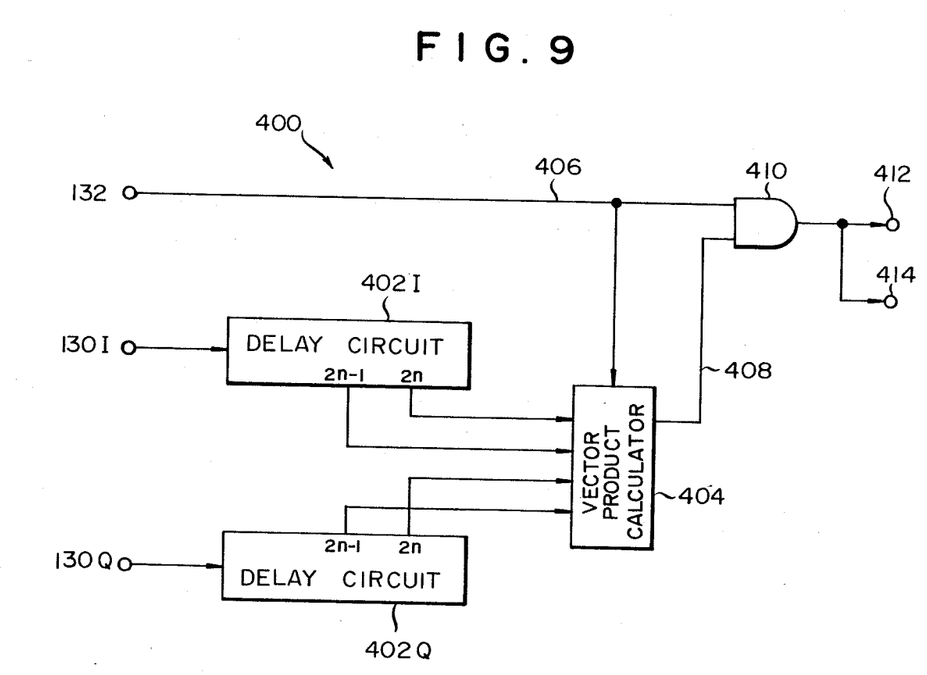
FIG. 9 is a function block diagram showing details of an example of a decision function associated with the transition shown in FIG. 4.

The in-phase component output 130I from the sampling circuit 110I and the quadrature component output 130Q from the sampling circuit 110Q are supplied to a transition decision circuit 400 as well, as shown in FIG. 4. The circuit 400 is adapted to decide a point of transition from an alternation to a pseudorandom sequence in the training sequence for a modem. Details of the circuit 400 is schematically shown in FIG. 9.

As previously described, assume that transition from an alternation of symbols A and B in the training sequence as shown in FIG. 1 to a pseudorandom sequence of symbols C and D shown in FIG. 2 has occurred at a time t. While the receiving side detects the transition by the detector 132 as described, there is a possibility of an error on the order of $\pm 1$ symbol period when the line distortion is large. That is, assuming a training signal ABAB ... ABABCDCDDCCDDC ..., the detector 132 tends to erroneously determine the symbol B or D just before or after the first appearance of the symbol C as the first symbol C.

Assuming that the signal sampling frequency is Ts and if the symbol is properly detected at a time t, the symbol A should have been received at a time $(t-2nTs)$ which is antecedent to the time t by a period of an even number of samples, and the symbol B should have been received at a time $(t-(2n-1)Ts)$ which is antecedent to the time t by a period of an odd number of samples; n being a positive integer. The relation between these symbols will be inverted if an error on the order of $\pm 1$ symbol period occurs in the detection of a transition point when the line distortion is large, that is, if the symbol B or D just before or after the initial appearance of the symbol C is erroneously determined as the first C.

Therefore, upon detection of a transition at the time t, whether the detection of a transition has been correct may be decided by checking signals received at the two different times $(t-2nTs)$ and $(t-(2n-1)Ts)$ which are close to and individually precede the time t. In short, such realizes a protection function against a failure in the detection of a transition point. Advantageously, the value n should be relatively large in order to allow a minimum of intersymbol interference due to symbols adjacent to a transition point to occur.

As discussed above, in accordance with the present invention, protection against erroneous detection of transitions is achieved utilizing the characteristic of an alternation that the intersymbol interference therein is relatively weak and, if it exists, discrimination of symbols is relatively easy.

The symbols A and B may be discriminated by producing, for example, a vector product. In detail, a phase relation is determined on the basis of a vector product $AB \sin \theta$ of vectors $\overline{A}$ and $\overline{B}$ which are respectively representative of the symbols A and B. Here, A and B are the absolute values of the vectors, while $\theta$ is an angle viewed according to the right-hand thread rule.

Therefore, when the symbols A and B are received in this order, their vector product is positive; when the sequence is reverse, the vector product is negative. Representing in-phase and quadrature components of the symbols A and B respectively by suffixes I and Q, AIBQ−BQAI will be calculated upon the receipt in the order of A and B, while BIAQ−BQAI will be calculated upon the receipt in the order of B and A; the results are identical in absolute value and opposite in sign.

To enhance the accuracy of detection, it is preferable to check a phase relationship by obtaining a mean value of several samples. For example, assuming that a symbol received at the time $(t-2kTs)$ is Xk and a symbol received at the time $(t-(2k-1))$ is Yk, the following calculation may be performed:

$$\overline{X_k} = (1/C) \sum_{k=k1}^{k2} X_k$$

$$\overline{Y_k} = (1/C) \sum_{k=k1}^{k2} Y_k$$

where C, k1 and k2 are constants.

By such an operation, mean values of the in-phase and quadrature components are obtained. This is followed by an operation $$\overline{X_{kI}} \cdot \overline{Y_{kQ}} - \overline{X_{kQ}} \cdot \overline{Y_{kI}}$$

and its sign is checked. If the sign is plus, the detection of the transition point is correct; if it is minus, the detection is incorrect.

The decision described above may be implemented by delay circuits 402I and 402Q and a vector product calculator 404 shown in FIG. 9. In the circuitry shown in FIG. 9, the in-phase component 130I of the received signal is delayed by the delay circuit 402I while the quadrature component 130Q is delayed by the delay circuit 402Q. The output of the delay 402I delayed by a 2n-symbol period and the output of the delay 402Q delayed by a (2n−1)-symbol period are applied to the vector product calculator 404 which is installed for the previously discussed vector product operation.

The delays 402I and 402Q may be implemented by RAMs. In such a case, to reduce the required capacity of the RAMs, it is preferable that the delay times for the sign identification, i.e. $(t-2nTs)$ and $(t-(2n-1)Ts)$, be not so long.

As the transition detector 132 detects a transition at the time t, the vector product calculator 404 is energized as indicated by a line 406 in order to produce a product of the symbol appeared at the time $(t-2nTs)$, which is an output of the delay 402I, and the symbol appeared at the time $(t-(2n-1)Ts)$, which is an output of the delay 402Q, delivering the result to an output 408. The output 408 is assumed to be high level when the vector product is positive and low level when it is negative. When the vector product is positive, an AND circuit 410 produces AND of the output 408 and the output 406 of the transition detector 132, making its outputs 412 and 414 high level. The outputs 412 and 414 are routed, for example, to the timing recovery circuit 118 and carrier recovery circuit 120 (FIG. 4). If the detection of the transition is correct, the subsequent training will occur with that timing and carrier detection.

In the manner described, whether detection of a transition point is correct is determined utilizing the characteristic of an alternation that intersymbol interference therein is relatively weak and the alternation is known. Therefore, in this particular embodiment, symbols are discriminated at a time antecedent to the time of transition detection by a period of an even number of samples and a time point immediately before the time of transition detection. This is only illstrative, however, and may be replaced with discrimination of symbols at any desired two time points in an alternation which do not neighbor each other. Further, an arrangement may be made to decide whether a symbol at a single time point is coincident with a predetermined symbol.

As described above, protection against erroneous detection is achieved by deciding whether the detection of a transition point in the training sequence has been correct, utilizing an alternation. This allows such decision to be made overcoming even a substantial line distortion, thereby enhancing the performance as that of a modem.

While the present invention has been shown and described in each of the embodimens in relation with a modem, it may alternatively be applied to a unit featuring a demodulating function only. The present invention is not limited to the training sequence according to the CCITT Recommendation V. 29 and is advantageously applicable to any other training sequence insofar as it has a transition from an alternating sequence of two kinds of symbol elements to a pseudorandom symbol sequence.

Next, description will be made of a carrier recovery system applicable particularly to a demodulator for QAM or phase modulation (PM) data transmission and which is another subject matter of the present invention.

In relation with 4-level or 8-level QAM, for example, there has been proposed a system in which, before determining a value of a signal received through a transmission line in a vector space, a phase error of a carrier is estimated to correct the carrier phase by an amount proportional to the estimated error.

Generally, where the phase distortion in a transmission line is substantial, simply correcting the phase by an amount proportional to an estimated carrier phase error as when the phase distortion is small tends to result in erroneous discrimination of a received signal; a signal residing in a region of a signal space which should be determined correct might be decided as residing in another region adjacent to the correct one. Such an error in discrimination would allow the subsequent phase compensation to occur in an erroneous direction and amount, thereby adversely effecting an automatic equalizer and other portions of the modem, that is, delaying the convergence of various parameters or causing them to diverge.

The present invention is concerned with a carrier recovery system which is free from the drawback discussed above and promotes stable recovery of a carrier by reducing an error in the compensation of a carrier phase due to erroneous symbol discrimination when subjected to an excessive phase distortion.

Figure 10:
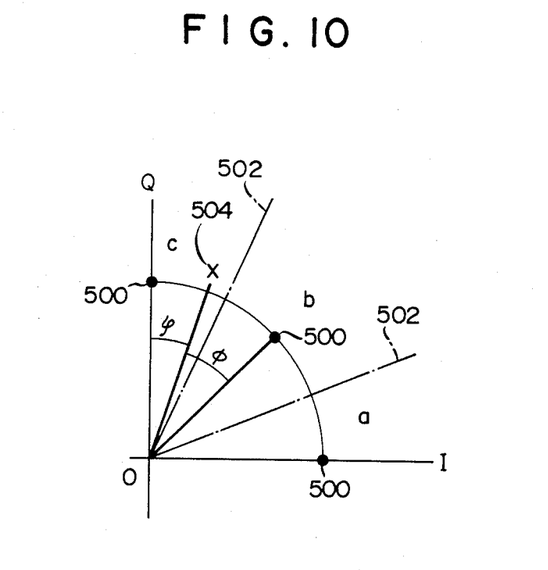
FIG. 10 is a signal space diagram showing the first quadrant of a signal space in order to explain discrimination of a symbol in an 8-level QAM signal space.

In the CCITT Recommendation V. 27ter (4,800 bits/second), for example, 8-level QAM is used. FIG. 10 shows a signal space of the 8-level QAM with respect to the first quadrant.

In FIG. 10, three ideal signal points 500 representative of symbols a, b and c are contained in the first quadrant of the signal space which is defined by an in-phase axis I and a quadrature axis Q. The symbols a, b and c are discriminated from each other by boundaries represented by two dash-and-dot lines 502 which are individually inclined $-\pi/8$ and $\pi/8$ radians with respect to the I and Q axes (positive in the counterclockwise direction). For example, a received signal 504 represented by x in the illustrated position will be identified as the symbol c.

However, when a received signal has undergone a substantial phase distortion in the transmission line, the demodulator is apt to fail to correctly identify it. For example, despite that the signal 504 received at the position x should indicate the symbol b, it is identified as the symbol c because it lies in the signal region c. In that case, the phase error is erroneously estimated to be the phase difference-$\Psi$ with respect to the ideal signal point 500. As a result, despite that the correct phase difference is the phase difference $\phi$ with respect to the ideal signal point of the symbol b, the carrier phase is corrected by the angle $\Psi$ in the unexpected counterclockwise direction.

Figure 11:
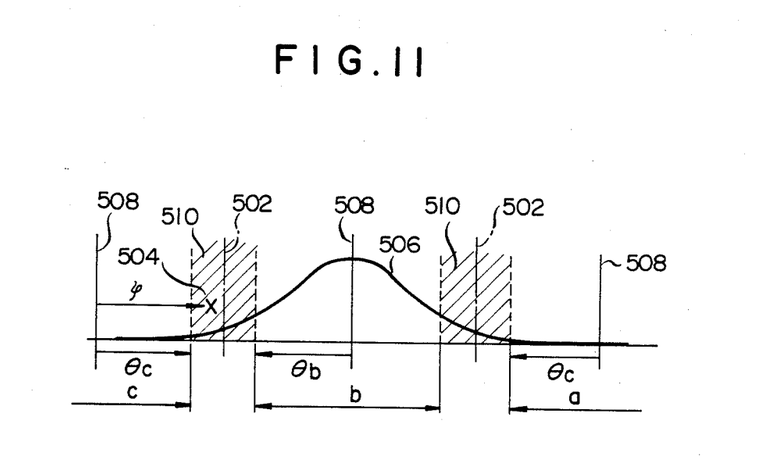
FIG. 11 is a diagram representative of a distribution of estimated phase errors of received signals.

Let it be assumed that a transmitted signal is subjected to phase distortion and its probability of deviation from the expected ideal signal point is in a Gaussian distribution. Then, the symbol b may be represented by a curve 506 shown in FIG. 11. In FIG. 11, positions of the symbols a, b and c are indicated by solid lines 508 on the abscissa, while the distribution of occurrence of deviation from the ideal signal point b is indicated on the ordinate.

In accordance with the present invention, a limit $\theta$ is employed for the estimation of a phase error. In detail, taking the symbol b for example, phase correction proportional to an estimated phase error is effected only in a limited range which extends over a phase angle $\theta b$ at each side of the ideal signal point b; the signal region b is isolated from adjacent signal regions a and c by dead zones which are represented by hatched regions 510 in FIG. 11.

Assume that a signal which should indicate the ideal signal point b has been received as a signal 504 indicated by the position x. Then, since the phase error $\Psi$ is larger than the phase correction limit $\theta c$, the phase error is limited to $\theta$ in accordance with the principle of the present invention. The phase error $\theta c$ is naturally smaller than the phase error $\Psi$ which would develop if without such limitation, so that the amount of erroneous and excessive correction of the carrier phase is reduced. That is, when the received signal expected to indicate the ideal point b has shifted into the dead zone 510, the estimated phase error is not more than $\theta b$ or $\theta c$. This decreases the amount of erroneous correction of the carrier phase.

The probability that a signal indicative of the ideal point b enters the adjacent signal region c or a beyond the dead zone 510 is very small insofar as the Gaussian distribution is preserved. Therefore, only if the limit $\theta$ mentioned above is appropriately selected, the phase error will hardly be corrected toward an incorrect symbol. This insures stable carrier recovery.

Figure 12:
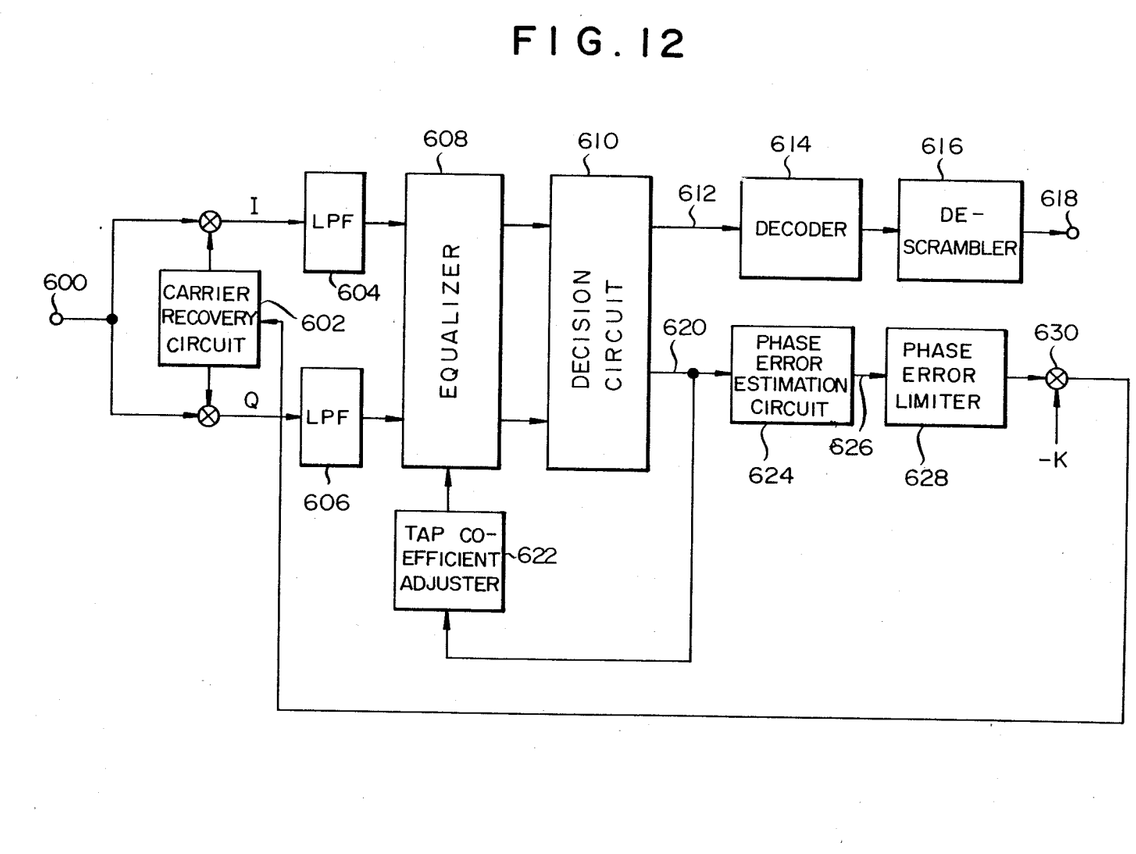
FIG. 12 is a block diagram of a modem to which a carrier recovery system in accordance with the present invention is applied.

Referring to FIG. 12, a demodulator which employs the above-described principle of a carrier recovery system of the present inention is shown. The demodulator in the illustrative embodiment is of the ordinary QAM type.

A signal transmitted over an analog transmission line such as a telephone line is applied to an input terminal 600 of the demodulator. The received signal is separated by a carrier recovery circuit 602 into an in-phase component (I) and a quadrature component (Q). These components (I) and (Q) are respectively routed through low-pass filters (LPF) 604 and 606 to an equalizer 608 which is adapted to equalize the line characteristics. The equalized received signal is applied to a decision circuit 610 for symbol estimation. A signal 612 indicative of estimated symbols is decoded by a decoder 614 into a string of binary bits and, then, fed to a descrambler 616. The descrambler 616 descrambles the sequence of the bit string to apply it to an output terminal 618 as a correct string of binary bits.

Meanwhile, an error signal 620 output from the decision circuit 610 is used by a tap coefficient adjusting circuit 622 for the purpose of correcting the tap coefficient of an equalizing filter of the equalizer 608. At the same time, the error signal 620 is applied to a phase error estimating circuit 624. The output 626 of the phase error estimating circuit 624 is indicative of an estimated phase error $\Psi$ and is delivered to a phase error limiter 628. The phase error limiter 628 functions to monitor the estimated phase error $\Psi$ so as to confine the phase error within the range smaller than the previously mentioned limit $\theta$. Preferably, the limit $\theta$ ($>0$) is semifixedly set in the limiter 628. A multiplier 630 multiplies the phase error signal undergone the error limitation by a phase coefficient $-k$ which is a proportional constant for phase correction, the result bing used by the carrier recovery circuit 602 for the phase correction of a carrier. Generally, the phase coefficient lies in the range of "0" to "1".

Figure 13:
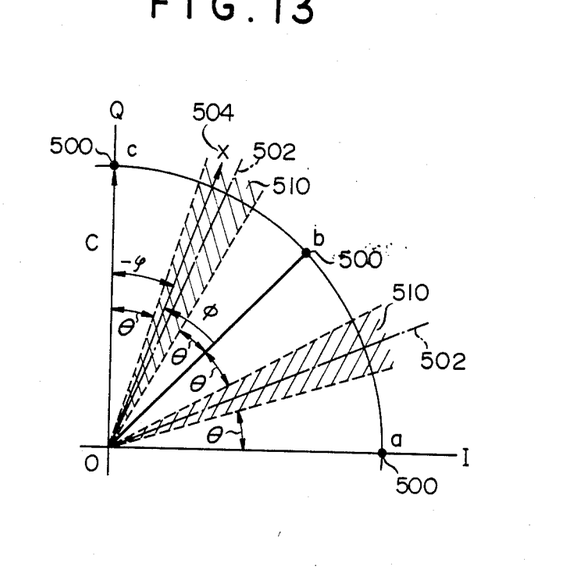

Concerning the CCITT Recommendation V. 27ter (4,800 bits/second), FIG. 13 shows a signal space of the first quadrant similar to one shown in FIG. 10. In FIG. 13, assume that a signal 504 which should indicate the ideal signal point b has been transmitted and received at the position x in the signal space.

Since the received signal point 504 lies in the signal region c, the decision circuit 610 determines that the received signal is the signal c and transfers it to the decoder 614. At the same time, the decision circuit 610 supplies the tap coefficient adjusting circuit 622 and the phase error estimating circuit 624 with a phase error signal 620, which is a difference between a received signal vector R and a vector C of the estimated signal c, i.e. R−C.

First of all, the phase error estimating circuit 624 estimates a phase error from the received signal, error signal and the like. In the illustrative embodiment, despite that the expected phase error concerning the ideal signal point b is $\phi$, the circuit 624 erroneously estimates it as $-\Psi$ due to the erroneous decision by the decision circuit 610.

A prior art carrier recovery system has not been furnished with any function which corresponds to the phase error limiter 628. In such a system, the estimated phase error $-\Psi$ is directly multiplied by the phase coefficient $-k$ and the product $k\Psi$ is used for carrier recovery. This means rotating the carrier phase counterclockwise by $|k\Psi|$. However, as shown in FIG. 13, the correct phase error is the phase error $\phi$ with respect to the symbol b and, therefore, the correct amount of phase correction should be $-k\phi$. That is, the carrier phase should be shifted clockwise by $|k\phi|$. In short, the prior art system allows the carrier phase to be corrected in an erroneous direction and amount due to erroneous decision of a symbol.

In accordance with the present invention, the output 626 of the phase error estimating circuit 624 is connected to the phase error limiter 628 which monitors a phase error estimated by the estimating circuit 624. That is, the limiter 628 monitors whether or not the estimated phase error $-\Psi$ output from the estimating circuit 624 has exceeded the limit $\theta$.

Figure 14:
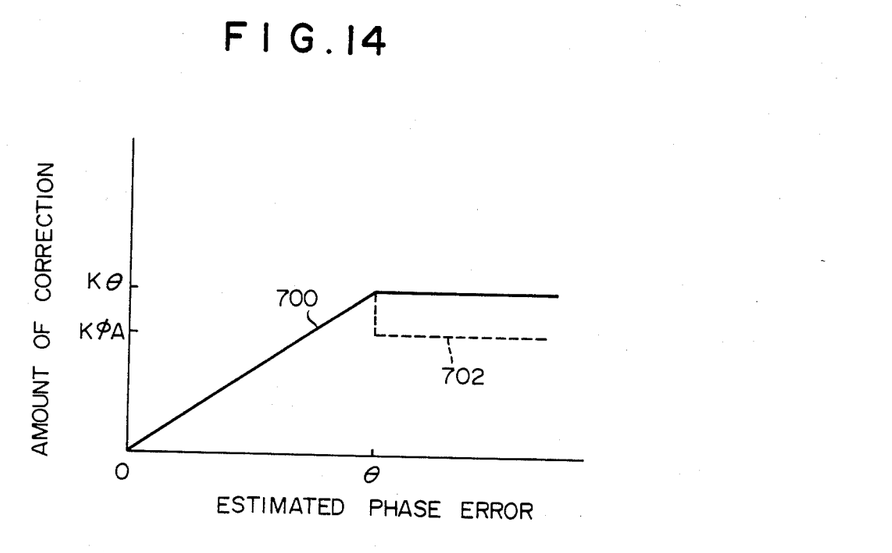
FIG. 14 is a signal space diagram showing the first quadrant in order to describe phase correction in an 8-level QAM signal space.

For example, when a signal 504 residing in the dead zone 510 is received, the amount of phase compensation in accordance with the illustrative embodiment is limited to the value $\theta$ because the estimated phase error $-\Psi$ is larger than the limit $-\theta$. As shown in FIG. 14, when $|-\Psi|>\theta$, the limiter 628 develops an estimated phase error not as $-\Psi$ but as $-\theta$. The multiplier 630 multiplies the estimated phase error by the phase coefficient $-k$ and delivers the resulting amount of phase correction, $k\theta$, to the carrier recovery circuit 602. Obviously, the amount of correction $k\theta$ is smaller than $k\Psi$. When $|-\Psi|<\theta$, the limiter 628 directly delivers the estimated phase error $-\Psi$ so that the multiplier 630 multiplies it by the phase coefficient $-k$, the product $k\Psi$ indicative of an amount of phase correction being fed to the carrier recovery circuit 602. The correction amount, therefore, varies along a curve 700 shown in FIG. 14. It will be apparent from FIG. 14 that the amount of erroneous correction of a carrier phase is smaller than one particular to the prior art system which lacks the phase error limiter 628.

While in the embodiment described above the limiter 628 is constructed to set up the phase correction amount $k\theta$ upon the increase of the estimated phase error $\Psi$ beyond the limit $\theta$, it may alternatively be constructed to develop a different predetermined value $\phi A$. The value $\phi A$ may be larger than or smaller than $\theta$. If it is smaller than $\theta$, the phase correction amount will vary along a dotted curve 702 shown in FIG. 14. Further, the value $\phi A$ may even be zero in which case no phase correction will occur upon the increase of the estimated phase error $\Psi$ beyond the limit $\theta$.

Furthermore, an arrangement may be made such that the value $\phi A$ varies with the estimated phase error $\Psi$, that is, such that the carrier recovery circuit 602 is supplied with the phase correction amount $k\Psi$ so long as the estimated phase error $\Psi$ remains smaller than the limit $\theta$ and with a phase correction amount $k1\Psi$ upon the increase beyond the limit $\theta$, where k1 is a proportional constant and generally smaller than k.

It will be apparent to those skilled in this art that the present invention is advantageously applicable to any other type of QAM or PM system. In the case of the CCITT Recommendation V. 27ter (2,400 bits/second), for example, the phase correction limit and the dimensions of the dead zones will be predetermined to match with ideal signal points which are in the phases of 0, $\pi/2$, $\pi$ and $3\pi/2$.

Although the embodiment of the present invention has been shown and described in relation with a demodulator which is implemented by a discrete hardware construction, the present invention is advantageously applicable even to a demodulator of the type employing digital signal processings implemented by a processor.

In summary, it will be seen that the present invention promotes stable recovery of a carrier by limiting the amount of phase correction or making it practically zero when there is any possibility of erroneous decision due to a substantial error in phase estimation.

Various modifications will become possible for those skilled in the art after receiving the teachings of the present disclosure without departing from the scope thereof.

What is claimed is:

1. A system for detecting synchronization in data transmission which, in a training sequence for receiving a two-dimensionally modulated signal by way of a demodulator, detects a point of transition from an alternating symbol sequence of two different symbol elements to a pseudorandom symbol sequence, said system comprising:
   calculator means for calculating a vector sum of two signals in a signal space which are time-serially remote from each other by a period of two symbol elements;
   comparator means for comparing said vector sum with a predetermined threshold value; and
   detector means for detecting said point of transition in terms of a decrease of the vector sum beyond said threshold value.

2. A system as claimed in claim 1, in which the comparator means is constructed to compare the vector sum and the threshold value with respect to an absolute value of a vector.

3. A system as claimed in claim 1, in which the comparator means is constructed to compare the vector sum and the threshold value with respect to signal power.

4. A system for detecting synchronization in data transmission which, in a training sequence for receiving a two-dimensionally modulated signal by way of a demodulator, detects a point of transition from an alternating symbol sequence of two different symbol elements to a pseudorandom symbol sequence, said system comprising:
   calculator means for calculating a vector difference between two signals in a signal space which are time-serially remote from each other by a period of two symbol elements;
   comparator means for comparing said vector difference with a predetermined threshold value; and
   detector means for detecting said point of transition in terms of an increase in the vector difference beyond said threshold value.

5. A system as claimed in claim 4, in which the comparator means is constructed to compare the vector difference and the threshold value with respect to an absolute value of a vector.

6. A system as claimed in claim 4, in which the comparator means is constructed to compare the vector difference and the threshold value with respect to signal power.

7. A system for detecting synchronization in data transmission which, in a training sequence for receiving a two-dimensionally modulated signal by way of a demodulator, detects a point of transition from an alternating symbol sequence of two different symbol elements to a pseudorandom symbol sequence, said system comprising:
   first detector means for detecting said point of transition; second detector means for determining whether a symbol at a first time point which is antecedent to the time point of the detection of the transition by a first predetermined period of time and a symbol at a second time point which is antecedent to the time point of the detection of the transition by a second predetermined period of time correspond to anticipated two symbol elements in the alternating symbol sequence; and
   decision means for deciding that the point of transition is correct when said symbols at said first and second predetermined time points correspond to said anticipated symbols.

8. A system as claimed in claim 7, in which said first and second time points are remote from each other by a period of one symbol element of a received signal.

* * * * *